United States Patent

Tanaka

[11] Patent Number: 5,784,660
[45] Date of Patent: Jul. 21, 1998

[54] MOUNTING STRUCTURE OF A FILM PASSAGE FORMING PLATE FOR A PHOTOGRAPHIC CAMERA

[75] Inventor: Yasuhiko Tanaka, Saitama-ken, Japan

[73] Assignee: Fuji Photo Optical Co., Ltd., Japan

[21] Appl. No.: 544,617

[22] Filed: Oct. 18, 1995

[30] Foreign Application Priority Data

Oct. 19, 1994 [JP] Japan ................... 6-278549

[51] Int. Cl.$^6$ .................. G03B 17/00; G03B 17/24
[52] U.S. Cl. .................. 396/440; 396/310; 396/535
[58] Field of Search .................. 354/288, 203, 354/105, 106, 173.1, 173.11; 396/440, 315, 319, 423, 542, 535, 541, 310

[56] References Cited

U.S. PATENT DOCUMENTS

| | | | |
|---|---|---|---|
| 4,662,736 | 5/1987 | Taniguchi et al. | 354/412 |
| 5,028,942 | 7/1991 | Kirigaya | 354/106 |
| 5,155,511 | 10/1992 | Tamamura | 354/76 |
| 5,181,065 | 1/1993 | Hara | 354/485 |
| 5,517,266 | 5/1996 | Funaki et al. | 354/106 |
| 5,600,385 | 2/1997 | Takeshita | 396/319 |
| 5,600,387 | 2/1997 | Yamada et al. | 396/315 |

Primary Examiner—Safet Metjahic
Assistant Examiner—Christopher E. Mahoney
Attorney, Agent, or Firm—Price, Heneveld, Cooper, DeWitt & Litton

[57] ABSTRACT

A photographic camera and method for assembling a photographic camera are disclosed. The photographic camera includes a novel mounting structure for a film passage forming plate, which may have components such as a photosensor, a magnetic head, and a film advance control substrate mounted thereon. The film passage forming plate is flexibly attached to a camera body such that it may be moved away from the camera aperture formed in the camera body while initial focusing and testing is conducted after assembly of the camera. In addition, the photographic camera includes a first control substrate carried by the camera body that is electrically connected to the film advance control substrate by a flexible wiring plate which serves to flexibly attach the film passage forming plate to the camera body so that the film passage forming plate may be moved away from the camera aperture after the film advance control substrate is wired to the camera.

24 Claims, 3 Drawing Sheets 5,784,660

MOUNTING STRUCTURE OF A FILM PASSAGE FORMING PLATE FOR A PHOTOGRAPHIC CAMERA

BACKGROUND OF THE INVENTION

The present invention relates to a mounting structure for a photographic camera of a type such that a cartridge carrying a roll of film therein is loaded by inserting the cartridge into the camera in a direction corresponding to an axis of the cartridge and an initial advance from the cartridge causes a first film frame to be set over a camera aperture.

Recently, the photographic camera has been remarkably popularized as various efforts have been successfully made to develop the photographic camera to be extremely easy to handle. The camera of such popularized type is generally used with 135 roll film commonly referred to as 35 mm size film. The 135 roll film is traditionally cased within a so-called Patrone and a leading end of the film is left to project out from the Patrone by a certain length so that a user may easily fix the leading end to an advance spool. However, the leading end thus left projecting out from the Patrone is rather troublesome for those inexperienced in handling the Patrone since the leading end often prevents a smooth film loading operation.

To overcome such inconvenience, a photographic camera using a cartridge instead of the Patrone, has been proposed. The cartridge is adapted to encase a roll of film therein leaving no leading end thereof projecting out and to be loaded into the camera by inserting the cartridge into the camera in a direction parallel to an axis of the cartridge. For initial film advance, a cartridge spool is rotated so as to advance the film from the cartridge and to set a first film frame over the camera aperture.

Some of the cameras using such a cartridge are constructed so that the cartridge may be loaded into or unloaded from the camera through an opening formed in a bottom of the camera. As a result, it is unnecessary to open the camera back for loading or unloading of the film as has been the case with the conventional camera using 135 roll film, and the conventional hinged camera back is replaced by a rear cover enclosing the rear side of the camera. In the case of the conventional camera using the 135 roll film, the hinged camera back is provided with the components such as a film passage forming plate and a liquid crystal display panel adapted to display various information including, for example, information on the state of the camera and date of photographing as the occasion demands. With the hinged camera back being closed, the film passage forming plate comes in contact with film rails extending along upper and lower edges of the aperture so as to define a tunnel space between the film passage forming plate and these film rails. The film passage forming plate as well as the film rails are also necessary for the above-mentioned camera using the cartridge and the rear side of the camera is provided with the liquid crystal display panel, if desired.

Regarding the camera using the cartridge, it is also well known to provide the film with a magnetic recording track serving to record for each film frame various data, e.g. data on which each photograph is based and data instructions for printing to thereby facilitate handling of the film. The camera using such film is correspondingly provided with a magnetic head in opposition to the magnetic recording track on the film and adapted to write or read the data into or out from the magnetic recording track. In addition, an optical sensor such as a photosensor is provided in opposition to film perforations to detect a length by which the film has been advanced. Because the magnetic head, photosensor, and liquid crystal display panel are located behind the film, a control circuit serving to control these components is also located behind the film.

However, the well known camera using the cartridge still has a serious problem as will be described, so far as the film passage forming plate, the liquid crystal display panel, the magnetic head, the photosensor, and a control circuit for the components are mounted on the rear cover. More specifically, after the camera is completely assembled, the camera must be subjected to adjustments and tests such as initial focusing and determination of photometric data. The adjustments as well as the tests must be conducted as the camera is driven. However, the camera of this well known type can not be driven unless the rear cover continues to be held against the front cover of the camera, since the control circuit also includes a control circuit for film advance in order to leave an adequate space within the camera for other parts. Nevertheless, the adjustments as well as the tests must be conducted with the rear cover being moved away from the front cover because a collimator and a photometer will be set over the aperture for the initial focusing and the determination of photometric data, respectively. In view of such a requirement, it had been a practice that various adjustments as well as tests are conducted with the rear cover closed after the control circuits are connected.

It is also well known to conduct the adjustments and tests by driving the camera utilizing separately prepared drive means prior to connection of the control circuits, and, upon completion of these adjustments and tests, to connect the control circuits and finally to attach the rear cover to the front cover. According to such alternative arrangement, the drive means exclusively used for adjustments and tests is required, which not only increases manufacturing costs but also complicates the operation of assembling.

SUMMARY OF THE INVENTION

In view of the above mentioned problems, it is a principal object of the invention to provide a mounting structure of a film passage forming plate for a photographic camera using a cartridge with a leading end of a roll of film not projecting out therefrom so that the film is initially advanced from the cartridge until a first film frame is set over an aperture and provided with a liquid crystal display panel and a group of switches exposed rearward that is so improved that initial focusing as well as tests can be easily conducted after a desired connection of the control circuit has been made without requiring drive means or the other equipment exclusively used for such adjustments and tests.

Additional features and advantages of the present invention will be set forth in part in the description which follows and in part will be apparent from the description, or may be learned by practice of the invention.

The object set forth above is achieved, according to an aspect of the invention, by a photographic camera comprising a camera body having an aperture formed therein, a film passage forming plate for cooperatively forming a film passage channel with the camera body across the aperture, and a flexible strap connecting the film passage forming plate to the camera body such that the film passage forming plate may be selectively moved away from the aperture for initial camera adjustments and testing prior to being more permanently mounted to the camera body.

Preferably, the film passage forming plate is flexibly and detachably mounted to the camera body and the camera body to which the film passage forming plate has been attached is enclosed by a front cover and a rear cover adapted to be attached to the front cover and to which a liquid crystal display panel has been attached.

In assembling the camera, the second control substrate on which magnetic information writing means such as a magnetic head, film advance detector means such as a photosensor and the liquid crystal display panel are placed and connected thereto is mounted on the film passage forming plate. This film passage forming plate is attached to the camera body and covered with the rear cover which is then fixed to the front cover.

Adjustment such as initial focusing and various tests are conducted with the components such as the magnetic head, the photosensor and the second control substrate being mounted on the film passage forming plate. The invention allows the camera to be driven in this state without requiring any separately prepared means and the other equipment such as the drive means exclusively used for such adjustments and tests. By electrically connecting the first control substrate mounted on the camera to the second control substrate mounted on the film passage forming plate by the flexible conductive strap extending upward from the upper edge of the film passage forming plate, such adjustments and tests can be conducted with the film passage forming plate being moved away from the aperture.

The object set forth above is achieved, according to an aspect of the invention, by a method of assembling a photographic camera comprising the steps of assembling a camera body including an aperture formed therethrough and a photographic lens; assembling a film passage forming plate; flexibly connecting the film passage forming plate to the camera body using a flexible strap; moving the film passage forming plate away from the aperture in the camera body; adjusting the focus of the photographic lens; and mounting the film passage forming plate to the camera body to form a film passage channel therebetween past the aperture.

The features and advantages of the invention may be realized and obtained by means of the instrumentalities and combinations particularly pointed out in the written description and claims hereof, as well as the appended drawings.

BRIEF DESCRIPTION OF THE DRAWINGS

The accompanying drawings, which are incorporated in, and constitute a part of, this specification illustrate several embodiments of the invention and together with the description, serve to explain the objects, advantages, and principles of the invention. In the drawings.

DETAILED DESCRIPTION OF THE PREFERRED EMBODIMENT

The mounting structure of a film passage forming plate according to the invention will now be more specifically described in reference with a presently preferred embodiment illustrated by the accompanying drawings.

Figure 1:
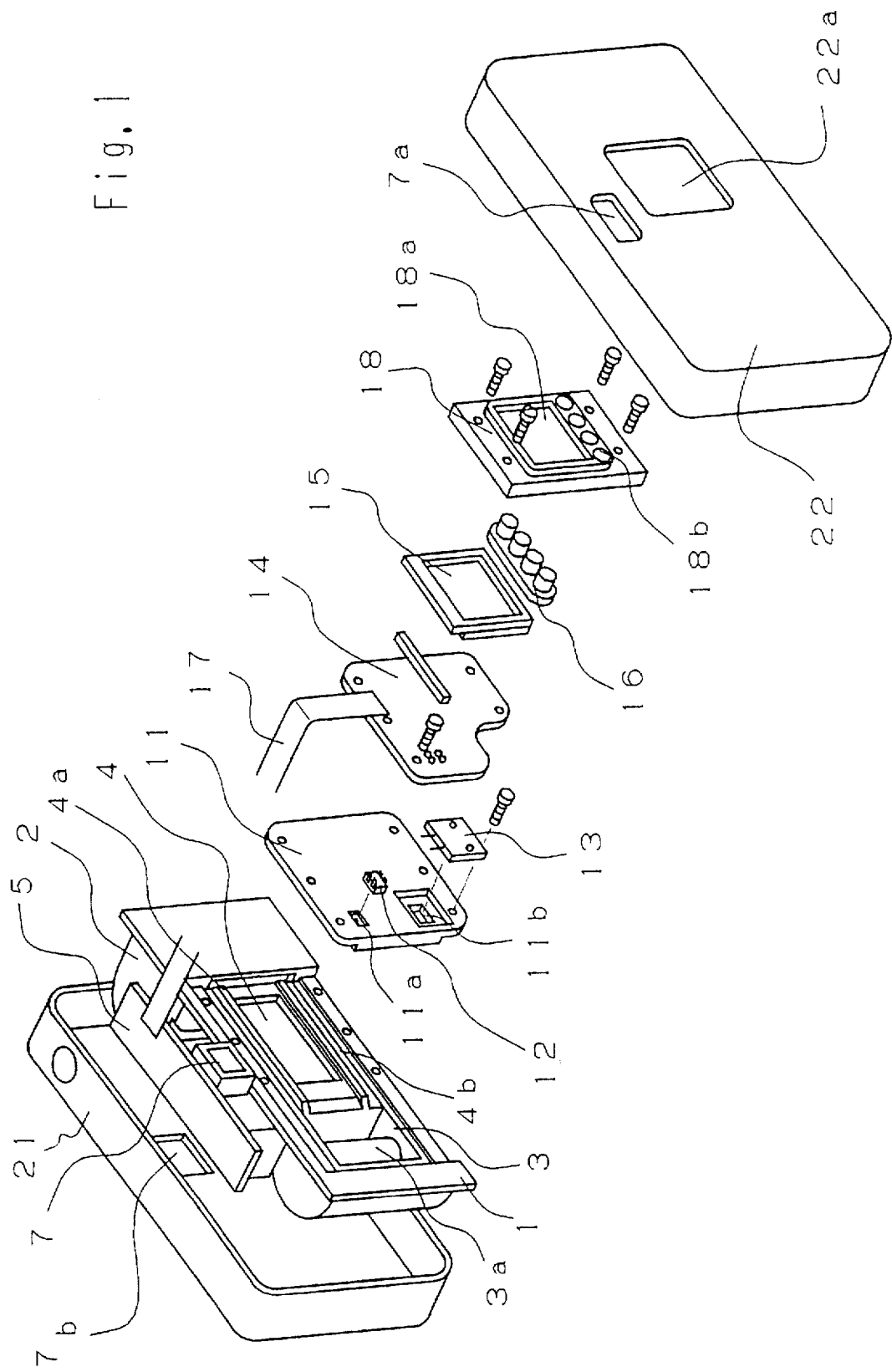
FIG. 1 is an exploded perspective view schematically showing the camera provided with the mounting structure of a film passage forming plate of the present invention as viewed obliquely from behind.

FIG. 1 is an exploded perspective view schematically showing a photographic camera equipped with the inventive structure for mounting the film passage forming plate as viewed obliquely from a rear side of the camera. A camera body 1 is provided at one of its transversely opposite sides with a cartridge chamber 2 destined to be loaded with a cartridge (not shown) carrying a roll of film therein and at the other side with a spool chamber 3 in which an advance spool 3a is rotatably supported. The camera body 1 is formed on its rear side with an aperture 4 extending intermediately of cartridge chamber 2 and spool chamber 3. The aperture 4 is provided along its upper and lower edges with film rails 4a, 4b, respectively. With such arrangement, the film 6 (FIG. 3) loaded into the camera is stepwise advanced from the cartridge chamber 2 into the spool chamber 3 and each section extending across the aperture 4 defines each film frame to be exposed.

The camera body 1 is further provided on its upper part with a first control substrate 5 carrying thereon a control circuit serving to control various systems including a varifocus lens system, an auto-exposure system, and an autofocus system.

A film passage forming plate 11 is detachably mounted on the camera body 1 at a location covering aperture 4 so that upper and lower parts of this film passage forming plate 11 may cooperate with the film rails 4a, 4b to define a tunnel space. The film passage forming plate 11 is formed at appropriate locations thereon with windows 11a, 11b and on its rear side with spot faced edges of suitable configuration surrounding these windows 11a, 11b. A photosensor 12 serving as detector means for film advance is mounted in window 11a and a magnetic head 13 serving as writing means for magnetic information is mounted in window 11b.

Figure 3:
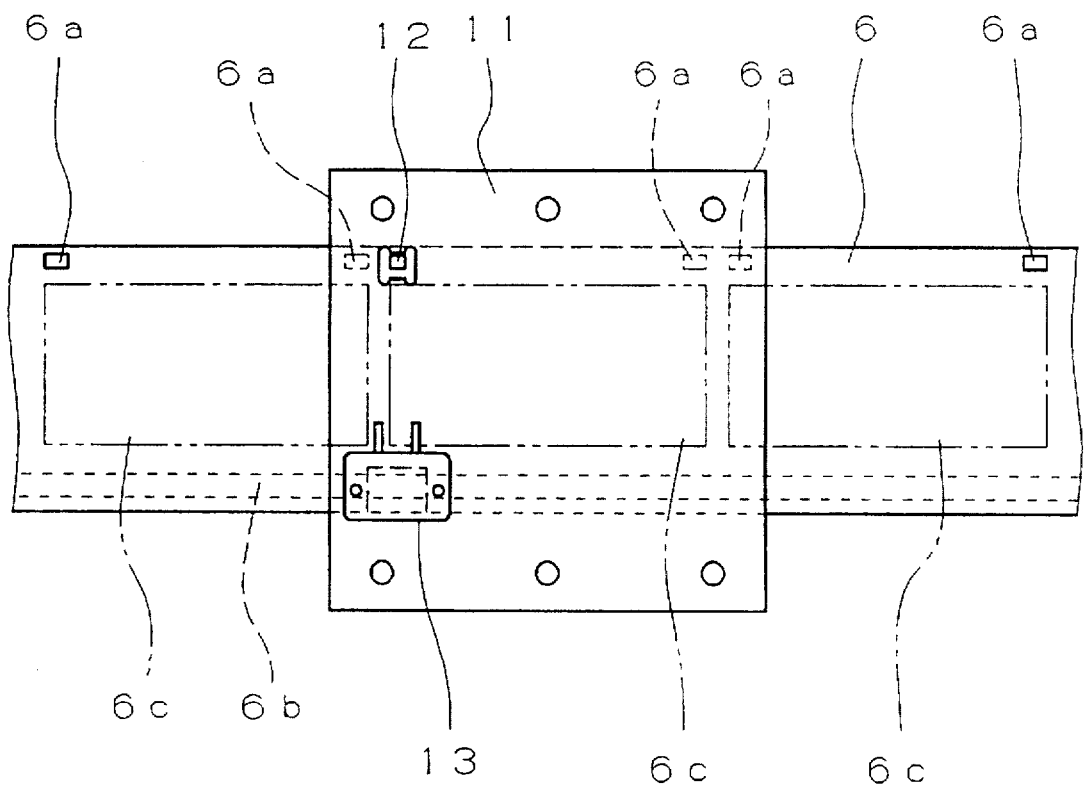
FIG. 3 is a rear view of the film passage forming plate provided with magnetic information writing means and film advance detector means.

Referring to FIG. 3, with the film passage forming plate 11 being normally mounted on the camera body 1, photosensor 12 lies just on a line defined by perforations 6a of the film 6 advanced along the rear side of the camera body 1 and counts the number of perforations 6a having passed by photosensor 12 to detect a length by which the film 6 has been advanced. Magnetic head 13 lies just above a magnetic recording track 6b of the film 6, with the film passage forming plate 11 being normally mounted on the camera body 1. Magnetic head 13 writes-in important information onto this magnetic recording track 6b, for example, photographing mode, exposure data for photographing, and desired number of prints. Reference numeral 6c in FIG. 3 designates an individual frame of the film 6.

Film passage forming plate 11 carries on its rear side a second control substrate 14, as seen in FIG. 1, and photosensor 12 as well as magnetic head 13 are electrically connected to this second control substrate 14. The second control substrate 14 is provided on its rear side with a liquid crystal display panel 15 and a series of switches 16 used to change the information to be displayed by this panel 15. Specifically, second control substrate 14 carries thereon a control circuit serving to control film advance, writing-in/reading-out of magnetic information, and driving of liquid crystal display panel 15. Second control substrate 14 is electrically connected by a flexible wiring plate 17 to first control substrate 5. Flexible wiring plate 17 serves as a flexible strap for flexibly connecting film passage forming plate 11 to camera body 1.

Liquid crystal display panel 15 and the series of switches 16 are covered with and thereby protected by a protector casing 18 which is, in turn, formed with opening 18a and 18b through which liquid crystal display panel 15 and the series of switches 16 are exposed, respectively.

Camera body 1 is received and held by a front cover 21 and then a rear cover 33 is mounted on this front cover 21 to enclose the camera body 1. The rear cover 22 is formed at its appropriate locations with an opening 22a so that liquid crystal display panel 15 and the series of switches 16 may be exposed through the opening 22a after the rear cover 22 has been joined to the front cover 21 to enclose the camera body 1. The rear cover 22 is formed with an ocular side window 7a for a viewfinder 7 carried by the camera body 1 so as to be aligned with an eyepiece of the viewfinder 7 whereas the front cover 21 is formed with an objective side window 7b so as to be aligned with an objective lens of the viewfinder 7.

Operation of the inventive film passage forming plate mounting structure within the camera constructed as described above will now be described in reference with the specific embodiment illustrated by the accompanying drawings.

In assembling the camera, the photosensor 12 and the magnetic head 13 are mounted on the film passage forming plate 11, then the second control substrate 14 previously connected by the flexible wiring plate 17 to the first control substrate 5 is mounted on the film passage forming plate 11. The liquid crystal display panel 15 and the series of switches 16 are previously mounted to second control substrate 14. The liquid crystal display panel 15 and switches 16 are, in turn, covered with the projector casing 18 mounted to the second control substrate 14.

Film passage forming plate 11 is attached to the camera body 1 which is then covered by the front cover 21. The rear cover 22 is joined to the front cover 21 to enclose the camera body 1 to thereby obtain a complete camera.

Figure 2:
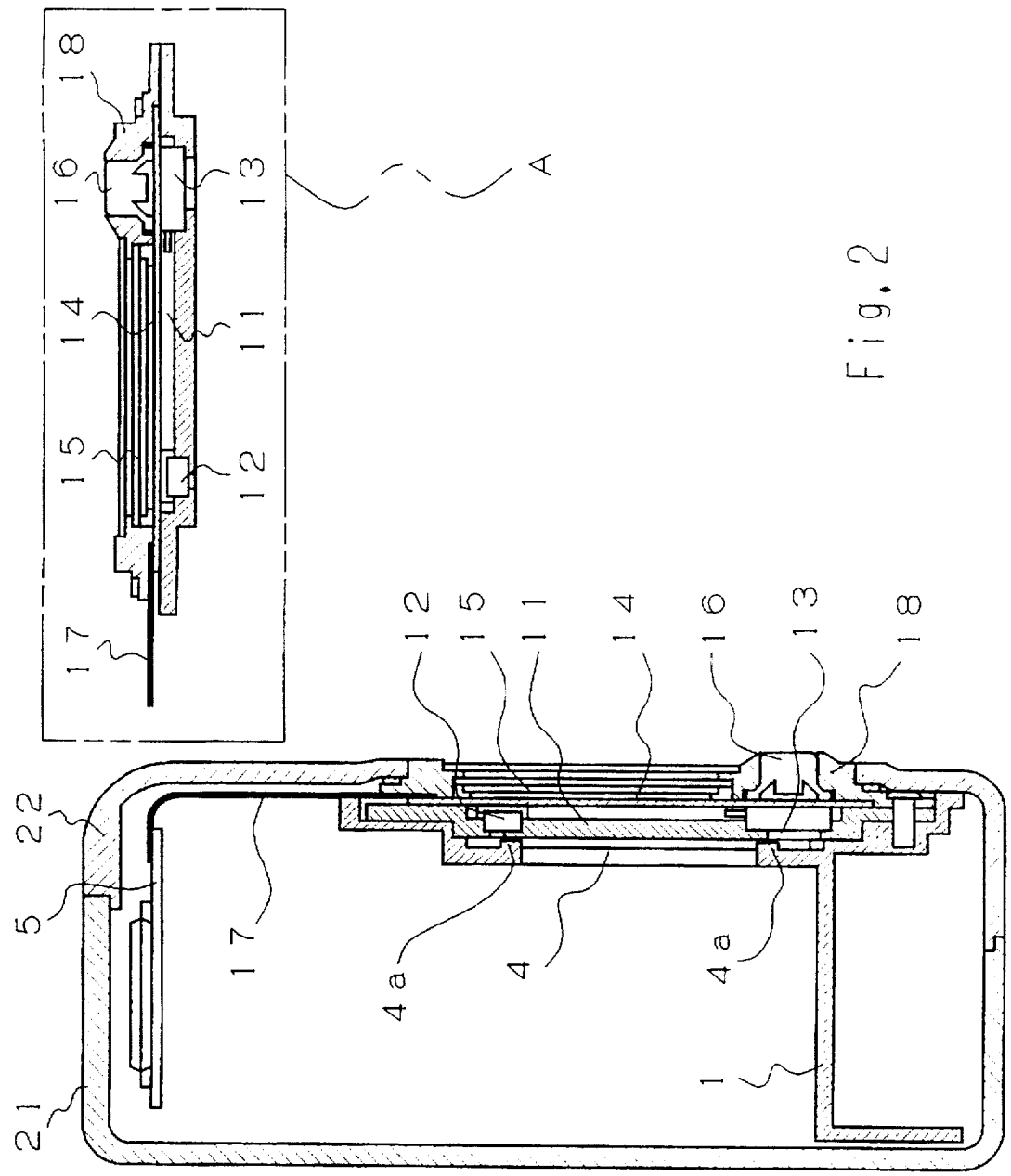
FIG. 2 is a longitudinal sectional view taken along a vertical plane including an optical axis of the camera, schematically showing the mounting structure of a film passage forming plate of the invention as the film passage forming plate is lifted for operations such as initial focusing.

Tests or initial focusing of the camera is conducted with the film passage forming plate 11 including the components carried thereon such as the photosensor 12, the magnetic head 13, and the second control substrate 14 swung into an upward position away from aperture 4 and with the rear cover 22 unattached. More specifically, the film passage forming plate 11 is maintained by flexible wiring plate 17 in connection with the camera body 1 since the second control substrate 14 carried by film passage forming plate 11 is connected by flexible wiring plate 17 to the first substrate 5. In addition, the flexible wiring plate 17 extends upward from the upper edge of the film passage forming plate 11 and therefore the film passage forming plate 11 may be swung up as indicated in position A of FIG. 2, to ensure that the aperture 4 is unobstructed and to allow an object to be photographed to be picked up through a photographic lens (not shown). In this state, the camera can be driven since the first control substrate 5 is properly connected to the second control substrate 14 by preexisting wiring. Accordingly, with the film passage forming plate 11 swung up, a collimator and a photometer may be attached to the aperture 4 to achieve the initial focusing and the testing.

As will be readily understood from the foregoing description, the novel mounting structure of a film passage forming plate for the photographic camera advantageously allows the camera to be driven without removing the predetermined components from the film passage forming plate, since the photosensor, the magnetic head, the second control substrate serving to control the film advance are mounted on the film passage forming plate which is, in turn, detachably mounted on the camera body. In this manner, the initial focusing and tests can be conducted with the rear cover removed and the film passage forming plate may be swung up away from the camera body. Thus, operation of assembling the camera can be simplified and drive means exclusively used for the initial focusing and testing becomes unnecessary.

The above embodiment was chosen for purposes of describing but one application of the invention. It will be understood by those who practice the invention and by those skilled in the art, that various modifications and improvements may be made to the invention without departing from the spirit of the disclosed concepts. The scope of protection afforded is to be determined by the claims and by the breadth of interpretation allowed by law.

The embodiments of the invention in which an exclusive property or privilege is claimed are defined as follows:

1. A photographic camera comprising:
   a camera body having an aperture formed therein;
   a film passage forming plate adapted to be fixedly mounted to said camera body for cooperatively forming a film passage channel with said camera body across said aperture during normal operation of the camera; and
   a flexible strap connecting said film passage forming plate to said camera body such that said film passage forming plate may be selectively moved away from said aperture for initial camera adjustments and testing prior to being fixedly mounted to said camera body.

2. The photographic camera as defined in claim 1 and further including:
   a first substrate containing a first control circuit mounted to said camera body; and
   a second substrate containing a second control circuit mounted to said film passage forming plate,
   wherein said flexible strap is an electrical connector for connecting said first and second control circuits.

3. The photographic camera as defined in claim 1 and further including film receiving means disposed in said camera body for receiving a cartridge containing a roll of film such that said cartridge may be loaded in the camera by inserting a cartridge into said film receiving means in a direction parallel to an axis of the cartridge.

4. The photographic camera as defined in claim 3, wherein said film receiving means includes a film advance spool for advancing the roll of film in a cartridge to align a first film frame of the film with said aperture when the cartridge is loaded into said film receiving means.

5. The photographic camera as defined in claim 1 and further including magnetic information writing means mounted to said film passage forming plate for writing information on a roll of film.

6. The photographic camera as defined in claim 5, wherein said magnetic information writing means includes a magnetic head.

7. The photographic camera as defined in claim 5, wherein said magnetic information writing means is electrically coupled to said second control circuit for control thereof.

8. The photographic camera as defined in claim 1 and further including film advance detector means mounted to said film passage forming plate for detecting an amount of film advancement.

9. The photographic camera as defined in claim 8, wherein said film advance detector means includes a photosensor for sensing light projected through perforations provided in a roll of film.

10. The photographic camera as defined in claim 8, wherein film advance detector means is electrically coupled to said second control circuit for control thereof.

11. The photographic camera as defined in claim 1 and further including:

a front cover mounted to said camera body; and a rear cover fixedly mounted to said front cover to seal the camera.

12. The photographic camera as defined in claim 1 and further including a liquid crystal display mounted to said film passage forming plate.

13. The photographic camera as defined in claim 12, wherein said liquid crystal display is electrically coupled to said second control circuit for control thereof.

14. A method of assembling a photographic camera comprising the steps of:

assembling a camera body including an aperture formed therethrough and a photographic lens;

assembling a film passage forming plate;

flexibly connecting the film passage forming plate to the camera body using a flexible strap;

moving the film passage forming plate away from the aperture in the camera body;

adjusting the focus of the photographic lens; and fixedly mounting the film passage forming plate to the camera body to form a film passage channel therebetween past the aperture.

15. The method as defined in claim 14 and further including the steps of:

mounting a first substrate containing a first control circuit to the camera body; and mounting a second substrate containing a second control circuit mounted to the film passage forming plate.

wherein the flexible strap is an electrical connector for connecting the first and second control circuits.

16. The method as defined in claim 15 and further including the step of mounting magnetic information writing means for writing information on a roll of film to the film passage forming plate.

17. The method as defined in claim 16 and further including the step of electrically coupling the magnetic information writing means to the second control circuit for control thereof.

18. The method as defined in claim 14 and further including the step of mounting film advance detector means for detecting an amount of film advancement to the film passage forming plate.

19. The method as defined in claim 18 and further including the step of electrically coupling the film advance detector means to the second control circuit or control thereof.

20. The method as defined in claim 14 and further including the steps of:

mounting a front cover to the camera body; and fixedly mounting a rear cover to the front cover to seal the camera.

21. The method as defined in claim 14 and further including the step of mounting a liquid crystal display to the film passage forming plate.

22. The method as defined in claim 21 and further including the step of electrically coupling the liquid crystal display to the second control circuit for control thereof.

23. A photographic camera comprising:

a camera body having an aperture formed therein;

a first substrate containing a first control circuit mounted to said camera body;

a film passage forming plate adapted to be fixedly mounted to said camera body for cooperatively forming a film passage channel with said camera body across said aperture during normal operation of the camera;

a second substrate containing a second control circuit mounted to said film passage forming plate; and a flexible electrical connector for electrically connecting said first and second control circuits and for flexibly connecting said film passage forming plate to said camera body such that said film passage forming plate may be selectively moved away from said aperture for initial camera adjustments and testing prior to being fixedly mounted to said camera body.

24. A method of assembling a photographic camera comprising the steps of:

assembling a camera body including an aperture formed therethrough and a photographic lens;

mounting a first substrate including a first control circuit to the camera body;

assembling a film passage forming plate;

mounting a second substrate including a second control circuit to the film passage forming plate;

connecting a flexible electrically conductive strap to the first and second control circuits to thereby provide a flexible connection of the film passage forming plate to the camera body;

moving the film passage forming plate away from the aperture in the camera body;

adjusting the focus of the photographic lens; and fixedly mounting the film passage forming plate to the camera body to form a film passage channel therebetween past the aperture.

* * * * *